No. 672,253. Patented Apr. 16, 1901.
L. E. ALLEN.
VEHICLE TIRE.
(Application filed Aug. 7, 1900.)
(No Model.)
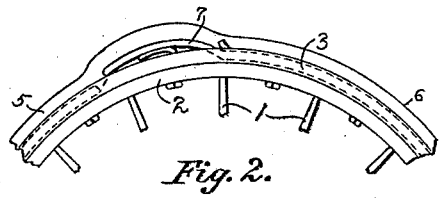
Fig. 2.
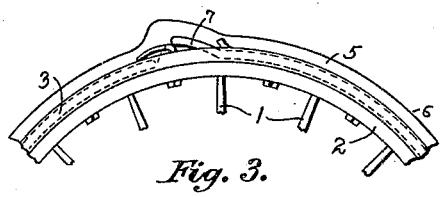
Fig. 3.
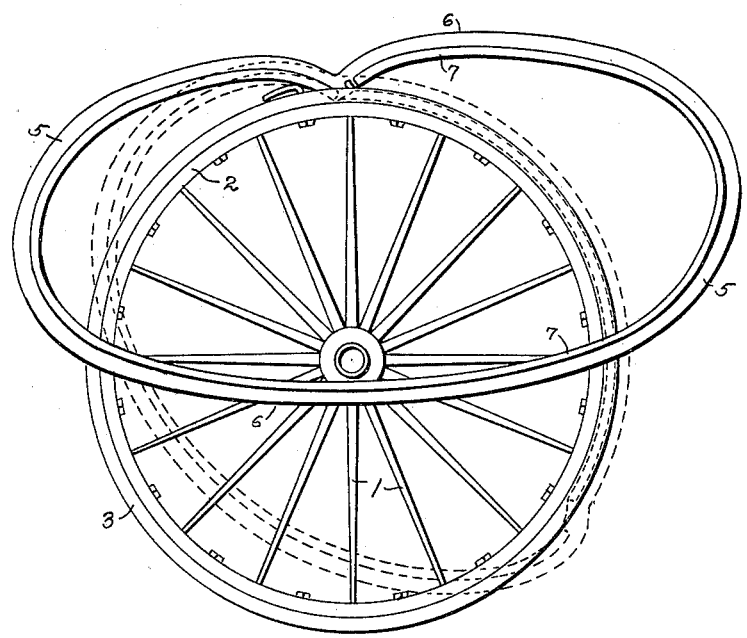
Fig. 1.
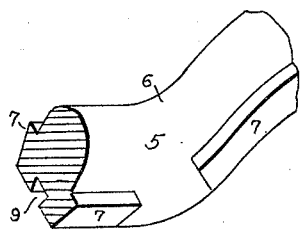
Fig. 6.
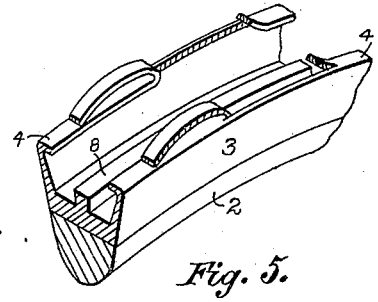
Fig. 5.
Fig. 4.
Witnesses:
Harry Frease.
J. R. Bond.
Inventor:
Lemuel E. Allen,
By J. W. Bond
Attorneys.

UNITED STATES PATENT OFFICE.

LEMUEL E. ALLEN, OF CANTON, OHIO, ASSIGNOR TO ANNA R. ALLEN AND WILLIAM J. POYSER, OF SAME PLACE.

VEHICLE-TIRE.

SPECIFICATION forming part of Letters Patent No. 672,253, dated April 16, 1901.

Application filed August 7, 1900. Serial No. 26,114. (No model.)

*To all whom it may concern:*

Be it known that I, LEMUEL E. ALLEN, a citizen of the United States, residing at Canton, in the county of Stark and State of Ohio, have invented certain new and useful Improvements in Metal and Cushion Vehicle-Tires; and I do hereby declare that the following is a full, clear, and exact description of the same, reference being had to the annexed drawings, making a part of this specification, and to the figures of reference marked thereon, in which—

Figure 1 is a side elevation of a vehicle-wheel, showing the first step of the process for connecting and applying the cushion-tire. Fig. 2 is a view showing the process farther advanced. Fig. 3 is a similar view showing the process substantially completed and the fullness of the tire in position to be taken out. Fig. 4 is a transverse section of the tire and rim. Fig. 5 is a view showing a portion of the rim or felly, and also showing portions of the retaining-flanges bent in position to allow the cushion-tire to be inserted under the retaining-flanges. Fig. 6 shows a portion of the cushion-tire and illustrating the lateral flanges cut or parted, and also showing the tire bent into position for insertion.

The present invention has relation to vehicle-tires; and it consists in the peculiar arrangement hereinafter described, and particularly pointed out in the claim.

Similar numerals of reference indicate corresponding parts in all the figures of the drawings.

In the accompanying drawings, 1 represents a wheel, which may be of the form shown or it may be of any other desired form, inasmuch as the vehicle forms no particular part of the present invention, except that a wheel must necessarily be employed to which the tire is attached.

The vehicle-wheel 1 is provided with the ordinary felly 2, which is connected to the spokes of the wheel in the ordinary manner. Upon the periphery of the felly 2 is located the metal rim 3, which metal rim is bolted or riveted to the felly 2 in the ordinary manner; but, if desired, the felly and rim may be formed integral. The rim 3 is provided with the inward-extending flanges 4, which flanges are so located that they will hold the cushion-tire 5 in proper relative position. The cushion-tire 5 is preferably formed of rubber, the tread portion 6 being of any desired form, and, as shown, it extends above or beyond the flanges 4. The cushion-tire 5 is provided with lateral flanges 7, which lateral flanges are preferably formed integral with the body of the tires. The cushion-tire 5 is or may be formed of an endless piece, or, in other words, without ends to be connected together to produce a continuous tire; but this is not absolutely necessary.

In order to connect the cushion-tire to the metal rim 3, portions of the flanges 7 on the cushion-tire are cut away, so as to allow the flanges 4 to be entered or passed through the space formed in the lateral flanges 7. The flanges 4 are separated or cut at any desired point, so that they may be turned or bent into the position illustrated in Fig. 5, or they may be bent in any other direction, as the only object is in providing an opening through which the lateral flanges of the cushion-tire may be entered, after which and after the cushion-tire is in position just described it is forced or bent into the rim 3 until the top of the flanges 7 come below or under the flanges 4. After the cushion 5 has been brought or placed in the position just described it is slid or moved around the rim 3 until the starting or bulged-out portion is brought opposite the opening, after which said bulged-out portion is forced down and upon the rim 3 and the cut flanges 4 bent to close the opening.

The rim 3 is provided with the flange 8, which flange is entered in the groove 9, formed in the tire 5, as illustrated in Fig. 4.

Having fully described my invention, what I claim as new, and desire to secure by Letters Patent, is—

The combination of a tire or rim provided upon its sides with inturned retaining-flanges, said inturned retaining-flanges provided with cut-out portions or lips, a cushion-tire provided with flanges, said flanges cut or severed, a groove formed in the cushion-tire, and a corresponding flange formed in the rim provided with the inturned flange, all arranged, substantially as and for the purpose specified.

In testimony that I claim the above I have hereunto subscribed my name in the presence of two witnesses.

LEMUEL E. ALLEN.

Witnesses:
H. B. WEBBER,
F. W. BOND.